(No Model.) 2 Sheets—Sheet 1.

C. TERROT.
VELOCIPEDE.

No. 435,466. Patented Sept. 2, 1890.

Witnesses:
L. N. Legendre
A. Faber du Faur

Inventor,
Charles Terrot.
by A. Faber du Faur Jr.
his Attorney (No Model.) 2 Sheets—Sheet 2.
C. TERROT.
VELOCIPEDE.
No. 435,466. Patented Sept. 2, 1890.
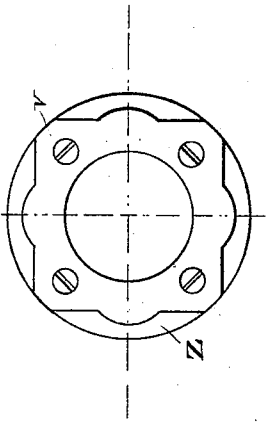
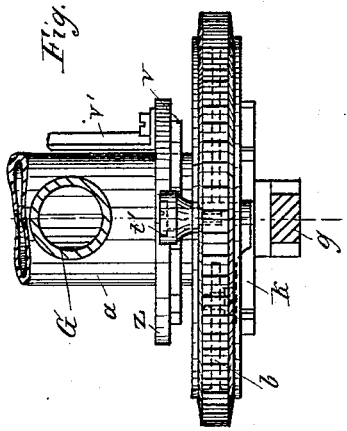
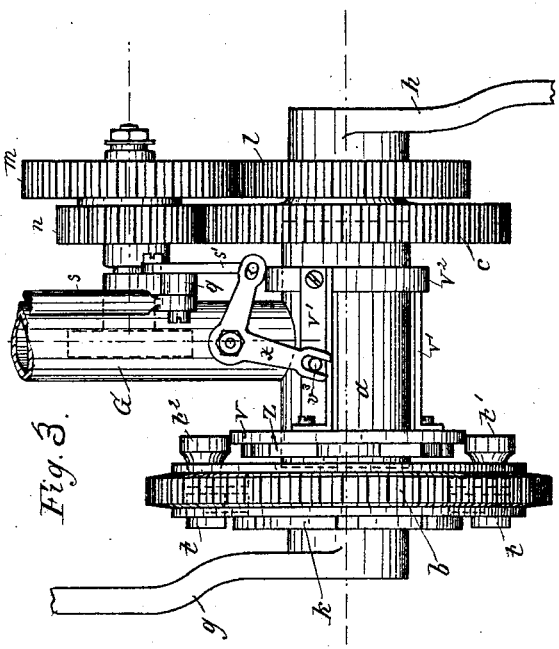
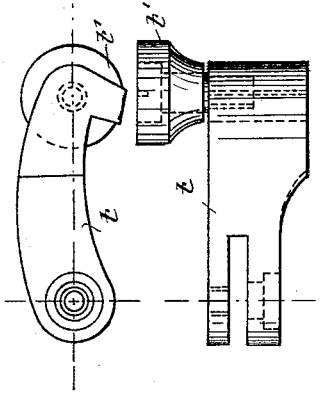
Witnesses:
L. N. Legendre
A. Faber du Faur
Inventor:
Charles Terrot
by A. Faber du Faur
his Attorney.

UNITED STATES PATENT OFFICE.

CHARLES TERROT, OF CANNSTADT, GERMANY.

VELOCIPEDE.

SPECIFICATION forming part of Letters Patent No. 435,466, dated September 2, 1890.

Application filed June 11, 1890. Serial No. 355,090. (No model.) Patented in Germany September 6, 1889, No. 51,904, and in France January 9, 1890, No. 203,045.

*To all whom it may concern:*

Be it known that I, CHARLES TERROT, a citizen of the Republic of France, residing at Cannstadt, in the Kingdom of Würtemberg, Germany, have invented new and useful Improvements in Velocipedes, (which have been patented to me in Germany September 6, 1889, No. 51,904, and in France January 9, 1890, No. 203,045,) of which the following is a specification.

When in velocipedes the device for transmitting motion is arranged in such a manner that the operator can move continuously at a great speed when running along a level road, it is not possible to overcome considerable ascents of the road and a second smaller gear is absolutely necessary. All the devices for remedying this inconvenience hitherto known to me had two main defects, either the velocipede was charged too much, or the device caused, not only when going uphill, but also when running along a level road, useless losses by friction, which were equivalent to a profuse expenditure of power, whereby the profit afforded when running uphill is consumed again. In other constructions the changement of gearing requires so much time that it cannot be effected on the road.

My improved device causes an additional weight of only one or two kilograms and it permits the operator to change gearing without descending by simply displacing a lever. There is, moreover, when running on level roads, no loss produced by friction.

The invention is shown in the accompanying drawings.

Figure 2:
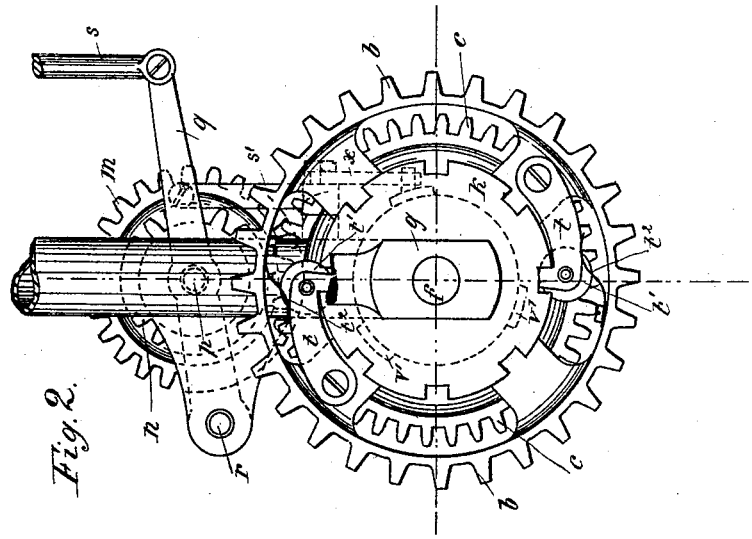
Figure 1:
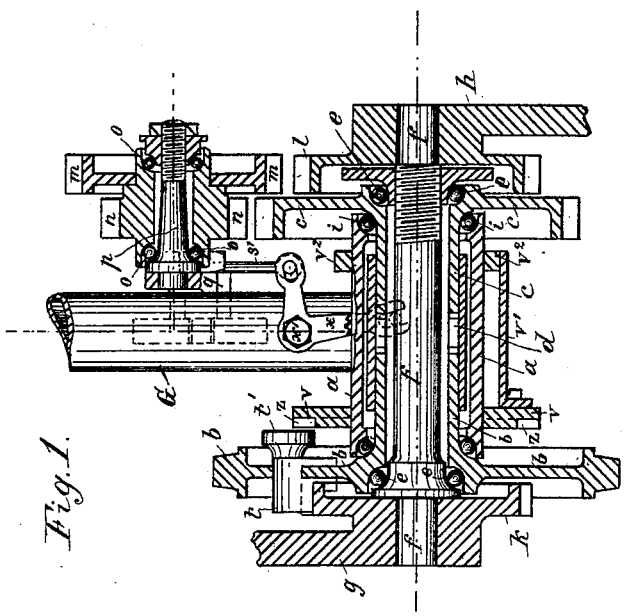

Figure 1 is a cross-section of the driving mechanism. Fig. 2 is a side elevation. Fig. 3 is a front elevation of the same; and Figs. 4, 5, 6, and 7 show details.

In Fig. 1, $a$ is the bearing of the crank-shaft applied to the frame G of the velocipede. In this bearing revolve on balls $i$ the chain-wheel $b$ and the transmitting-wheel $c$.

The naves of the wheels $b$ and $c$ are constructed so as to form a clutch-coupling connecting the said wheels to each other. They are held concentric to each other by the socket $d$, pushed over them and fixed to the wheel $b$ by means of a screw. In these coupled naves $b$ and $c$ revolves on balls $e$ the crank-shaft $f$, furnished at the left hand with the crank $g$ and at the right hand with the crank $h$. To the crank $g$ is secured a cam-disk $k$, and to the crank $h$ a toothed wheel $l$.

Two other toothed wheels $m$ and $n$, firmly connected to each other, revolve upon balls $o$ around a shaft $p$, secured to the lever $q$. The lever $q$ turns around a pivot $r$, fastened to the frame of the velocipede. The rod $s$, jointed to the lever $q$, serves to raise and to lower the latter in order to throw the toothed wheels $m$ and $n$, supported by the lever $q$, into and out of gear with the toothed wheels $l$ and $c$, respectively.

The rod $s$ is provided close to the saddle with a handle and guided in a bow, in which it may be fixed in its three different positions by the engagement of a spring-pin.

To the spokes of the chain-wheel $b$ are applied in a movable manner two diametrically-opposite pawls $t$, acted upon by small springs $t^2$ and engaging with their hook-shaped front parts into corresponding grooves of the cam-disk $k$, so that the chain-wheel $b$ and the crank-shaft are connected together.

In order to disengage the pawls $t$ each of the same carries a small steel roller $t'$.

The chain-wheel $b$ and the crank-shaft are disconnected from each other by means of a round disk $v$, provided with eccentric-lugs and connected through three straps $v'$ with a ring $v^2$. The disk $v$ and ring $v^2$ are movable in the horizontal direction upon the bearing $a$ of the crank-shaft. One of the straps $v'$ has a pin $v^3$, with which engages the bent lever $x$, connected with the lever $q$ through the rod $s'$. The lever $x$ turns on a pivot $x'$, fastened to the frame G. By the motion of the rod $s$, transmitted through lever $q$, rod $s'$, and bent lever $x$, the disk $v$ is also displaced.

When riding on uneven ground, the rod $s$, with lever $q$, is raised and held in this position by any suitable known means. By this the wheels $m$ and $n$ are thrown out of gear, and the ring $v^2$, with disk $v$, is moved to the right hand, whereby the pawls $t$ of the chain-wheel $b$ are lowered and catch into the cam-disk $k$, so that the chain-wheel $b$ is connected directly with the crank-shaft $f$, and both revolve together only on the balls $i$. When running uphill, the rod $s$ is lowered, whereby the disk $v$ is moved to the left hand, the rollers $t'$ enter the recesses $z$ of the disks $v$ and run on the same upon the circumference of the round disk $v$, whereby the pawls $t$ are raised and thrown out of gear with the disk $k$. The rod $s$ is then moved more downward, so that the toothed wheels $m\ n$ are thrown into gear with the toothed wheels $l$ and $c$. Wheel $l$ puts wheel $m$ in rotation, and the wheel $n$, connected to the wheel $m$, actuates the wheel $c$ and at the same time the chain-wheel $b$, which is driven now at the speed corresponding to the ratios of the wheels $m\ n\ c\ l$. When running downhill, the rod $s$ and lever $q$ may be held in their middle position, respectively. In this position the wheels $m$ and $n$ are out of gear with the wheels $l\ c$ and the pawl $t$ is not yet engaged. The cranks remain, therefore, at rest, and may serve as a support to the feet.

The adjustment of the bearings is effected by means of the nut $y$ applied to the thread of the shaft $f$. By turning this nut not only the ball-bearing $e$ is regulated, but also the two wheels $b$ and $c$ are pushed into each other by the lateral pressure of the balls $e$ until the balls $i$ are regulated also.

Having now particularly described and ascertained the nature of my said invention and in what manner the same is to be performed, I declare that what I claim is—

A device for modifying the speed of velocipedes actuated by chains, which device is characterized by the arrangement of pawls $t\ t$, applied to the spokes of the chain-wheel $b$, and coupling the latter by means of the cam-disk $k$ directly to the crank-shaft, in combination with the disk $v$, which is pushed for the purpose of modifying the speed by suitable rods and bent levers underneath the rollers $t'\ t'$ of the pawls $t\ t$, raising by this the latter from the cam-disk $k$ and disconnecting the crank-shaft and the chain-wheel from each other, but throwing also at the same time the toothed wheels $m\ n$, connected with the above-said rods, into gear with the wheels $c\ l$, connected with the crank-shaft and chain-wheel, respectively, so that the motion of the cranks is transmitted only by means of the toothed wheels $m\ n$ to the chain-wheel, substantially as set forth, and shown in the accompanying drawings.

In testimony whereof I have signed my name to this specification in the presence of two subscribing witnesses.

CHARLES TERROT.

Witnesses:
 LOUIS GOTTSCHALK,
 ERNST HUBER.